Oct. 7, 1969
V. EVTUHOV
3,471,799
LONGITUDINAL MODE CONTROLLED LASER
Filed Nov. 4, 1964
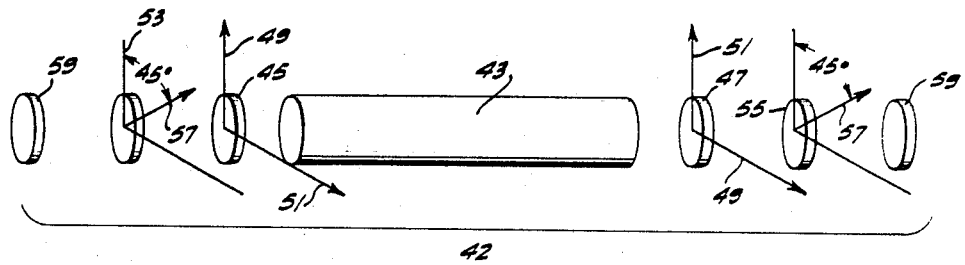
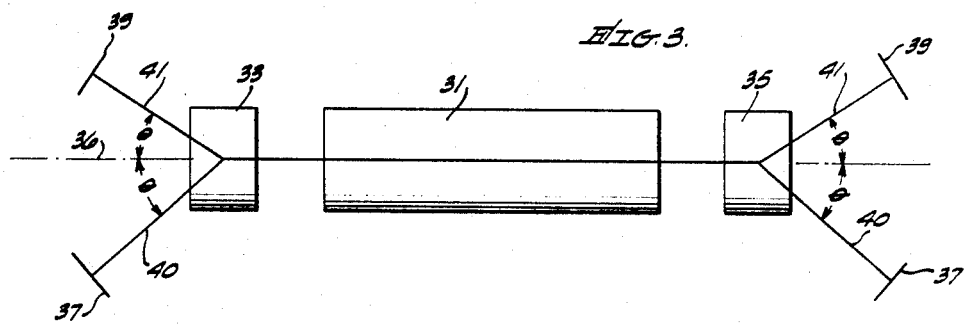
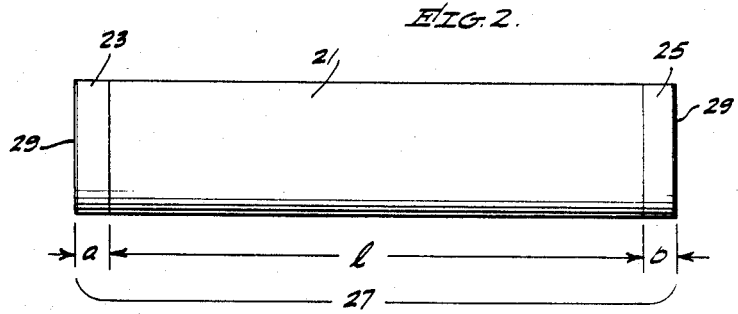
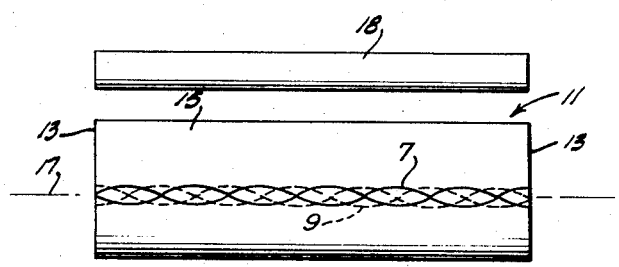
INVENTOR
VIKTOR EVTUHOV,
BY J. K. Haskell
ATTORNEY.

United States Patent Office 3,471,799
Patented Oct. 7, 1969

3,471,799
LONGITUDINAL MODE CONTROLLED LASER
Viktor Evtuhov, Pacific Palisades, Calif., assignor to Hughes Aircraft Company, Culver City, Calif., a corporation of Delaware
Filed Nov. 4, 1964, Ser. No. 408,812
Int. Cl. H01s 3/10
U.S. Cl. 331—94.5    6 Claims

ABSTRACT OF THE DISCLOSURE

This invention is a longitudinal mode controlled laser capable of single-frequency operation as well as two-frequency operation with frequency separation controllable within certain limits. Coherent light energy produced by an active laser element that is pumped to an excited state while situated in an optical resonant cavity is distributed along the longitudinal axis of the cavity in standing waves, each corresponding to different wavelengths, one of which has a greater gain than other waves and has two orthogonal components of polarization. A birefringent medium is also disposed within the resonant cavity and is adapted to shift the aforementioned orthogonal components of polarization along the longitudinal axis by one-quarter wavelength to provide a uniform and simultaneous depopulation of the active region of the laser crystal.

---

The invention herein described was made in the course of or under a contract or subcontract thereunder (or grant) with the Department of the Air Force.

This invention relates to a longitudinal mode controlled laser and more particularly to a solid-state laser capable of single-frequency operation as well as two-frequency operation with frequency separation controllable within certain limits.

It has long been known that conventional solid-state lasers are multimode devices. That is, their output spectrum consists of several frequencies corresponding to longitudinal and transverse modes of a laser cavity. It was found experimentally that not all the frequencies present in the laser output are emitted simultaneously, but that mode hopping takes place to a considerable extent.

It should be obvious that the ability to control mode hopping and to limit the number of modes excited would be highly desirable since it would enable the concentrating of all the laser energy which ordinarily goes into a large number of modes into a single or two-mode scheme.

Other advantages of mode controlled solid-state lasers, for example, would be in their application in laser Doppler radar systems where only a single frequency, highly stable and high power output signal is desired. Also, the two mode scheme with controllable frequency separation would be very advantageous in a Doppler radar system to provide both a high output signal and a local oscillator signal so that conventional intermediate frequency amplifier circuitry may be employed.

Gas lasers, contrary to solid-state lasers, can generally be easily made to exhibit single-mode operation but have the disadvantage of being inherently low power devices.

It has recently been proposed by C. L. Tang, H. Statz and G. de Mars in the Journal of Applied Physics, vol 34, p. 2289 (1963) that the presence of several longitudinal modes in certain lasers, such as ruby lasers as well as the phenomenon of mode hopping, is attributable to the lack of sufficiently rapid spatial relaxation of population inversion within the active region of the laser crystal. Experimental evidence in support of this proposal has been published by these same authors in Applied Physics Letters, vol. 2, p. 222 (1963). It is visualized in the hypothesis that when a solid-state laser (ruby laser in particular) in an ordinary resonator oscillates in a certain mode the active ions are de-excited at the antinodes for this mode and remain inverted at the position of the nodes. Thus, the population inversion becomes spatially modulated. Due to the lack of spatial relaxation, this modulation persists for a sufficiently long time so that the laser tends to shift the frequency of oscillation to a mode which has at least some of its antinodes at the maxima of the population inversion. Repetition of this process and its interaction with other factors, such as pumping which tend to restore inversion, are presumed to account for mode hopping and the appearance of several longitudinal modes in the output spectrum.

The above-referenced article in Applied Physics Letters describes a laser cavity having no standing-wave modes and therefore producing no modulation of the population inversion with the attendant mode hopping. The device described is somewhat complicated since it involves many optical elements including an optical isolator. It accordingly requires a very long resonator to accommodate these elements and as a consequence the original frequencies of this resonator (before the isolator is inserted) would be very closely spaced. This means that the gain for each frequency would be approximately the same, thus making it difficult to suppress all frequencies but the one or two frequencies desired, especially under transient conditions and at low temperatures. In this connection, see Physical Review, vol. 136, p. A1, 1964, "Spectral Properties of a Single Mode Ruby Laser: Evidence of Homogeneous Broadening of the Zero-Phonon Lines in Solids" by C. L. Tang, H. Statz, G. A. de Mars and D. T. Wilson.

From the foregoing, it can be seen that a simple configuration which would permit effective longitudinal mode control and single or double-longitudinal-mode operation retaining the simple standing-wave-mode feature in a short resonator of conventional lasers would be highly desirable. This has been accomplished in the present invention by following the proposition that if the active region of the laser crystal could be depopulated uniformly and simultaneously by standing-wave fields of a controlled number of frequencies or, in particular, a single frequency, the output spectrum could be modified and, in particular, the number of longitudinal modes could be reduced to one. The invention is also particularly adapted for use with transverse mode selection techniques, thus leading to true single-mode operation.

It is therefore an object of the present invention to provide a solid-state laser which has a concentrated output in a single-longitudinal mode of oscillation.

It is another object of this invention to provide a laser wherein all the laser energy which ordinarily goes into a large number of longitudinal modes is concentrated in a single-longitudinal mode, thus obtaining stable, high output, single-longitudinal-mode operation.

It is still another object of the invention to provide a solid-state laser capable of two-frequency operation with frequency separation controllable within certain limits.

It is yet another object of the present invention to provide a longitudinal mode controlled solid-state laser which is particularly adapted for use with transverse mode selection techniques for true single-mode operation.

These and other objectives are achieved, according to the invention, in a longitudinal mode controlled laser having resonant cavity wherein there is disposed an isotropic or uniaxial solid-state laser material. If the material is uniaxial, the axis is oriented along the axis of the laser resonator. The laser material is pumped to a lasing state to produce coherent light energy along a longitudinal axis. This energy is distributed along the longitudinal axis in standing waves, each corresponding to different wavelengths, one of which has a greater gain than other waves and has two orthogonal components of polarization. The laser also includes birefringent means disposed within the resonant cavity and adapted to shift the aforementioned orthogonal components of polarization along the longitudinal axis by one-quarter wavelength.

The invention will be described hereinafter by way of example and with reference to the accompanying drawing, in which:

FIG. 1 is a schematic representation of the desired field configuration for single-longitudinal-mode operation;

FIG. 2 illustrates a laser resonator employing quarter-wave plates designed to achieve a field configuration similar or identical to that of FIG. 1;

FIG. 3 is a laser resonator employing Wollaston prisms designed to achieve a field configuration similar or identical to that of FIG. 1; and FIG. 4 illustrates a laser resonator employing polarizing elements between birefringent plates and the resonator reflectors.

As stated previously, the invention aims at uniform and simultaneous depopulation of the active region of a laser crystal by standing-wave fields of a controlled number of frequencies to modify the output spectrum so that the number of longitudinal modes can be restricted. The following material will first concentrate on the principles and techniques for obtaining single-longitudinal-mode operation, and then various modifications will be dealt with.

The axial intensity distribution in a standing-wave mode of a laser resonator is proportional to $$\sin^2 \frac{2\pi z}{\lambda}$$

where $\lambda$ is the wavelength of the radiation in the mode and $z$ is the distance along the axis of the resonator. Thus, assuming no spatial relaxation, the spatial distribution of population inversion after oscillation in one mode becomes $$\cos^2 \frac{2\pi z}{\lambda}$$

As described before, this leads to oscillation in a different longitudinal mode. If, on the other hand, two standing waves of the same frequency are set up simultaneously with the intensity distributions proportional to $$\sin^2 \frac{2\pi z}{\lambda}$$

and $$\cos^2 \frac{2\pi z}{\lambda}$$

respectively, the de-excitation will become uniform since $$\sin^2 \frac{2\pi z}{\lambda} + \cos^2 \frac{2\pi z}{\lambda} = 1$$

and no modulation of the population inversion will result. Consequently, no mode hopping will take place in such a case.

The desired intensity distribution specified above can be achieved by considering the two polarizations of light in a resonator. What must be done is to shift the standing waves of the same frequency corresponding to the two polarizations by $\lambda/4$ with respect to each other. This is illustrated (for purposes of explanation only) in FIG. 1 where there is shown a standing wave of one polarization represented by solid lines 7 and a standing wave of another polarization shifted by $\lambda/4$ represented by dashed lines 9 propagating in a laser resonator or cavity 11. The resonator 11 includes mirrors 13 attached at each end of a body of active laser material such as the ruby rod 15 which has a longitudinal axis 17. The ruby rod 15 is pumped to an excited state by conventional means such as the flash lamp 18, connected to a source of pump energy (not shown) to produce laser energy. It should be noted that to achieve uniform de-excitation in such a case the gain in the active material should be very nearly the same for the two polarizations 7 and 9, so that threshold is reached at the same time for both standing waves. In the case of ruby, this requires that the c-axis of the laser crystal lie along the axis 17 of the rod 15. To preserve $\lambda/4$ shift throughout the laser material, the crystal should be of sufficiently high optical quality so that the optical path lengths are equal for the two polarizations 7 and 9.

There are many ways of achieving the required shift in practice. One configuration is illustrated in FIG. 2. Here, there is shown a laser ruby rod 21 of length $l$ having two-quarter wave plates 23 and 25 of birefringent material, such as sapphire or quartz, oriented at 90° to each other, cemented (butyl methacrylate) to the ends of the rod 21. The ends of the now composite laser rod 27 are coated with reflecting material such as silver mirrors 29 by conventional means, in this case, evaporation. Of course, detached mirrors may be utilized as the resonator or resonant cavity with the same results. The composite rod 27 is disposed in a conventional pump cavity including a flash lamp, such as flash lamp 18 in FIG. 1 but not shown here for the sake of clarity. The action within the rod 27 can be seen from the following simple considerations. Let the index of refraction of the laser rod 21 be $n$ for any polarization and the indices for the quarter wave plates 23 and 25 be $n'$ and $n''$ for the two polarizations, respectively. Then, the optical path lengths for the two polarizations are $$L_1 = n'a + nl + n''b$$

$$L_2 = n''a + nl + n'b$$

For $a = b$, $L_1 = L_2$ and the two polarizations will have exactly coincident longitudinal mode spectra and therefore oscillation will take place at the same frequency in both polarizations, namely, the frequency corresponding to the longitudinal mode closest to the center of the fluorescent line. The phase shift between the two polarizations is given by $$\Delta\phi = 2\pi/\lambda(n' - n'')a$$

If $(n' - n'')a = (2m+1)\lambda/4$, where $m$ is an integer, then $\Delta\phi = (2m+1)\pi/2$ and thus the two standing waves are $\pm 90°$ out of phase, as desired.

It may be desirable, although not necessary, to choose the birefringent material for the quarter wave plates 23 and 25 such that $n'$ and $n''$ are closely comparable to $n$. This will minimize the losses at the interfaces. Thus, in the case of ruby for the rod 21, it may be desirable to use sapphire for the quarter wave plates 23 and 25. It may also be desirable, but not necessary, to optically contact the birefringent plates 23 and 25 to the laser rod 21, again to minimize losses. This embodiment is particularly suited for use with a transverse mode selection technique described in a copending application Ser. No. 289,823 to obtain true single-mode operation.

The following data describes a longitudinal mode controlled laser constructed according to the invention and shown in FIG. 2.

Ruby rod 21: 1 inch long, 3 mm. diameter 0° ruby, nominal 0.05%.

Quarter wave plates 23 and 25: $a \approx b \approx 0.006$ inch thick sapphire material.

Silver mirrors 29: Evaporated silver, directly on plates 23 and 25. One mirror having at least 1% transmissivity.

Pump cavity (not shown): Double ellipse aluminum pump cavity, the ellipses having a common focus. The polished cavity is 2 inches long and has the ruby rod 21 at the common focus and a flash lamp at each of the other foci. The ellipses have a ¾ inch semimajor axis, each with a 0.33 eccentricity for each ellipse.

Pump flash lamps: Two linear xenon flash lamps are used. Each has a 5 mm. bore and a 2 inch active length. The flash lamps are energized by a conventional delay line type power supply providing approximately 150 joules.

It may be desirable in some cases to adjust the azimuthal position of the rod 21 to obtain the best results. This is due to characteristics inherent in each individual ruby rod. It may also be desirable, as mentioned above, to also use the transverse mode selection techniques. However, the foregoing may be obviated in the embodiment to be described later in connection with FIG. 4.

Another embodiment of the invention is illustrated in FIG. 3. Here, there is shown a laser rod 31 of, in this example, ruby material. On each side of the rod 31 are two polarization separation means in the form of Wollaston prisms 33 and 35. The prisms 33 and 35 are shown spaced from the rod 31 but may be in contact therewith. Beyond each of the prisms 33 and 35 is a set of reflectors 37 and 39 disposed at predetermined angles θ with respect to a longitudinal axis 36 of the rod 31. Two polarizations represented by lines 40 and 41 are shown propagating within the rod 31. These polarizations are separated by means of the Wollaston prisms 33 and 35 (or similar devices may be used) and a set of reflectors 37 and 39 is provided for each polarization. For longitudinal mode control, the optical path length between the reflectors of one set is adjusted with respect to the other set to give the field distribution shown in FIG. 1 in the active laser rod 31. The position of the reflectors 37 and 39 may be calculated by considering the optical path lengths for the two polarizations, taking into consideration the indices of refraction of the various materials in the resonator. The final adjustment can be made by observing the output spectrum of the laser through a Fabry-Perot interferometer, for example. It should be noted that FIG. 3 is a schematic drawing and the splitting of the polarizations indicated in the figure is for explanatory purposes only.

It is obvious that the above technique can be extended to achieve oscillation in two modes closely spaced in frequency. All that need be done is to make the optical path lengths for the two polarizations slightly different. This will displace the longitudinal mode spectra for the two polarizations with respect to each other. The two frequencies (one for each polarization) nearest to the center of the fluorescent line will be the most likely ones to oscillate. Of course, the de-excitation of the active ions will not be spatially uniform as in the case of complete coincidence in frequency between the two polarizations. However, the location of most effective de-excitation can be controlled by controlling the relative phase shift between the two polarizations. This, in turn, can be done by adjusting the optical thicknesses of the two birefringent plates 23 and 25 for the embodiment of FIG. 2. Thus, sufficiently uniform de-excitation may be obtained to prevent the laser from oscillating in any but the two desired frequencies.

The birefringent plates 23 and 25 referred to above can be replaced by a material of variable birefringence (such as some of the electro-optical materials used in Kerr cells). Then, it will be possible to switch, or gradually change, from multimode to two-mode or to single-mode operation. Also, the difference frequency between the two polarizations can, in principle, be adjusted to any value within the longitudinal mode spacing for a single polarization. Modulation of the difference frequency at a high rate is also possible.

The device for controlling the longitudinal mode spectrum of solid-state lasers described above with respect to FIG. 2 depends on equal excitation of two orthogonal polarizations along the axes of the birefringent material employed to shift the polarizations by λ/4. Although this equal excitation may occur naturally, it may be desirable to ensure this (especially if the laser crystal is imperfect) by inserting polarizing elements between birefringent plates and the resonator reflectors. As illustrated in FIG. 4, a laser resonator 42 includes a laser ruby rod 43 having quarter wave plates 45 and 47 situated opposite each of its ends. The plates 45 and 47 each have orthogonal fast and slow axis, designated 49 and 51 respectively. Polarizers 53 and 55, having a polarization axis 57, are disposed between the quarter wave plates 45 and 47 and similar reflectors 59. The axes 57 of the polarizers 53 and 55 are oriented at 45° with respect to both the slow and fast axes 49 and 51 of the birefringent quarter wave plates 45 and 47. The polarizers 53 and 55 provide that the light at the reflectors 59 is polarized at 45° with respect to the axes 49 and 51 of the birefringent plates 45 and 47. This polarization can be resolved into two equal amplitude components (not shown) along the axes 49 and 51 of the birefringent plates 45 and 47 as is required. In principle, any type of polarizer can be used in the device. However, ordinary dichroic materials generally have high losses and may make the attainment of laser oscillation threshold difficult. It may therefore be necessary to use high optical quality prism polarizers. The fast axis 49 of one plate is shown in the same plane as the slow axis 51 of the other plate. However, if the relationship between associated plates and polarizers are maintained, the fast axis 49 of one plate need not necessarily lie in the same plane as the slow axis 51 of the other plate.

From the foregoing, it will be seen that there is achieved a longitudinal mode controlled laser in which the active region of the laser crystal is depopulated uniformly and simultaneously by standing-wave fields of a controlled number of frequencies so that the number of longitudinal modes are reduced to one or more as desired.

Although specific embodiments have been herein described, it will be appreciated that other organizations of the specific arrangements shown may be made within the spirit and scope of the invention. For example, the active laser material may be any solid-state material exhibiting laser action, and the spacing of the various elements on each side of the laser rod 43 in FIG. 4 may be other than that shown. Furthermore, it should be noted that the sketches in the various figures are not drawn to any scale and the thicknesses and distances of and between various elements are not to be considered as being significant. As set forth previously, other components similar in function may be substituted for those which have been particularly named.

Accordingly, it is intended that the foregoing disclosure and the drawing shall be considered only as illustrations of the principles of this invention and are not to be construed in a limiting sense.

What is claimed is:
1. A longitudinal mode controlled laser, comprising: resonant cavity means for supporting laser energy produced within said cavity and having a longitudinal axis; solid-state laser material disposed within said cavity, said material having no preferred direction of polarization in a plane orthogonal to said longitudinal axis; pump energy means coupled to said laser material for exciting said material to a lasing state to produce coherent light energy along said longitudinal axis, said energy being distributed along said axis in standing waves each corresponding to different wavelengths, one of said waves having a greater gain than the other of said waves and having two orthogonal components of polarization; and birefringent means disposed within said cavity and adapted to shift said orthogonal components of polarization along said axis by one-quarter wavelength.

2. A longitudinal mode controlled laser, comprising: resonant cavity means for supporting coherent light energy produced within said cavity and having a logitudial axis; a solid-state laser rod disposed within said resonant cavity, said rod having no preferred direction of polarization in a plane orthogonal to said longitudinal axis; pump energy means coupled to said rod for exciting said rod to a lasing state to produce said coherent light energy along said longitudinal axis, said energy being distributed along said axis in standing waves each corresponding to different wavelengths, one of said waves having a greater gain than the other of said waves and having two orthogonal components of polarization; and birefringent means including a quater wave plate attached at each end of said rod and adapted to shift said orthogonal components of polarization along said longitudinal axis by one quarter wavelength.

3. A longitudinal mode controlled laser, comprising: resonant cavity means having a longitudinal axis and including two parallel mirrors orthogonal to and centered about said axis, at least one of said mirrors being partially transmissive to coherent light energy produced therein; a ruby laser rod having a longitudinal axis and parallel end surfaces orthogonal to said axis and disposed within said resonant cavity with its axis parallel to that of said cavity, said rod having no preferred direction of polarization in a plane orthogonal to said axes; pump energy means coupled to said rod for exciting said rod to a lasing state to produce said coherent light energy along said longitudinal axis, said energy being distributed in standing waves each corresponding to different wavelengths, one of said waves having a greater gain than the other of said waves and having two orthogonal components of polarization; and quarter wave sapphire plates attached at each of said end surfaces of said rod and adapted to shift said orthogonal components of polarization along said longitudinal axis by one-quarter wavelength.

4. A longitudinal mode controlled laser, comprising: an optical frequency resonant cavity having a longitudinal axis and including a pair of spaced mirrors disposed orthogonal to and substantially symmetrically about said axis, one of said mirrors being at least partially transmissive for coherent light energy produced within said cavity; a ruby laser rod having a longitudinal axis and disposed between said mirrors with its axis parallel to and substantially coincident with said longitudinal axis of said cavity, said rod having no preferred direction of polarization in a plane orthogonal to said axes; pump energy means coupled to said laser rod for exciting said rod to a lasing state to produce a coherent light energy beam substantially coincident with said longitudinal axis of said cavity; a quarter wave plate disposed adjacent each end of said rod and orthogonal to and substantially symmetrically about said beam, each of said plates having orthogonal fast and slow axes in respective first and second directions; and a prism polarizer disposed between each of said plates and associated mirrors and orthogonal to and substantially symmetrically about said beam, each of said polarizers having an axis of polarization oriented at 45° with respect to both said slow and fast axes between said first and second directions.

5. A longitudinal mode controlled laser, comprising: an optical frequency resonant cavity having a longitudinal axis and including a pair of spaced mirrors disposed orthogonal to and substantially symmetrically about said axis, one of said mirrors being at least partially transmissive for coherent light energy produced within said cavity; a ruby laser rod having a longitudinal axis and disposed between said mirrors with its axis parallel to and substantially coincident with said longitudinal axis of said cavity, said rod having no preferred direction of polarization in a plane orthogonal to said axes; pump energy means coupled to said laser rod for exciting said rod to a lasing state to produce a coherent light energy beam substantially coincident with said longitudinal axis of said cavity; a quarter wave plate disposed adjacent each end of said rod and orthogonal to and substantially symmetrically about said beam, each of said plates having orthogonal fast and slow axes in respective first and second directions, the fast axis of one of said plates being in the same plane as the slow axis of the other of said plates; and a prism polarizer disposed between each of said plates and associated mirrors and orthogonal to and substantially symmetrically about said beam, each of said polarizers having an axis of polarization oriented at 45° with respect to both said slow and fast axes between said first and second directions.

6. A longitudinal mode controlled laser, comprising: a ruby laser rod having a longitudinal axis and adapted to produce a beam of coherent light energy substantially along said axis when excited in a resonant cavity to a lasing state, said rod having no preferred direction of polarization in a plane orthogonal to said axis; a Wollaston prism disposed in the path of said beam adjacent each end of said rod and for splitting said beam emerging from each end of said rod into two diverging paths; pump energy means coupled to said rod for exciting said rod when in a resonant cavity to said excited state thereby producing said coherent light energy which is distributed along said beam in standing waves each corresponding to different wavelengths, one of said waves having a greater gain than the other of said waves and having two orthogonal components of polarization; and resonant cavity means for supporting said laser energy, said cavity including four mirrors each disposed in and orthogonal to a different one of said two diverging paths associated with each end of said rod, said cavity means serving to shift said orthogonal components of polarization along said beam by one-quarter wavelength.

References Cited

UNITED STATES PATENTS

| | | | |
|---|---|---|---|
| 3,214,590 | 10/1965 | Schactman | 350—150 |
| 3,409,843 | 11/1968 | Bowness | 331—94.5 |
| 3,229,223 | 1/1966 | Miller | 331—94.5 |

RONALD L. WIBERT, Primary Examiner

U.S. Cl. X.R.

350—150